United States Patent [19]
Urch

[11] Patent Number: 5,829,513
[45] Date of Patent: Nov. 3, 1998

[54] MOULDED BAFFLE HEAT EXCHANGER

[76] Inventor: John Francis Urch, 56 Bay Street, Taren Point, NSW, Australia

[21] Appl. No.: 302,673

[22] PCT Filed: Feb. 25, 1993

[86] PCT No.: PCT/AU93/00078

§ 371 Date: Sep. 8, 1994

§ 102(e) Date: Sep. 8, 1994

[87] PCT Pub. No.: WO93/18360

PCT Pub. Date: Sep. 16, 1993

[30] Foreign Application Priority Data

Mar. 12, 1992 [AU] Australia ............................... PL 1302

[51] Int. Cl.⁶ ................... F28D 9/00; F28F 3/08
[52] U.S. Cl. .................. 65/54; 165/165; 165/166
[58] Field of Search ................... 165/165, 166, 165/54, 167, 164

[56] References Cited

FOREIGN PATENT DOCUMENTS

| | | | |
|---|---|---|---|
| 1183834 | 3/1985 | Canada ................... | 165/166 |
| 0074740 | 3/1983 | European Pat. Off. ...... | 165/166 |
| 657274 | 5/1929 | France ................... | 165/166 |
| 1592524 | 6/1970 | France ................... | 165/166 |
| 2367265 | 5/1978 | France ................... | 165/165 |
| 2381990 | 10/1978 | France ................... | 165/166 |
| 2649361 | 6/1977 | Germany ................. | 165/166 |
| 0049793 | 3/1982 | Japan ..................... | 165/166 |
| 61-161397 | 7/1986 | Japan ..................... | 165/166 |
| 63-194191 | 8/1988 | Japan ..................... | 165/166 |
| 4-313693 | 11/1992 | Japan ..................... | 165/166 |
| 8204761 | 7/1984 | Netherlands .............. | 165/165 |
| 626864 | 7/1949 | United Kingdom ........ | 165/166 |
| 710932 | 6/1954 | United Kingdom ........ | 165/166 |
| 1172247 | 11/1969 | United Kingdom ........ | 165/166 |
| 1205933 | 9/1970 | United Kingdom ........ | 165/166 |
| 1498621 | 1/1978 | United Kingdom ........ | 165/165 |
| WO-8503564 | 8/1985 | WIPO ..................... | 165/166 |

*Primary Examiner*—John K. Ford
*Attorney, Agent, or Firm*—Smith-Hill and Bedell

[57] ABSTRACT

A gas-flow heat exchanger comprises a sinuously wound foil strip (11) providing a stack of parallel pockets (12) each of which contains a moulded plastics skeletal insert (13). The insert (13) comprises a flat rectangular frame (14) supporting within it a set of parallel baffles (15) which define a platen of passageways (16) extending between inlet and outlet openings (17 and 18) provided in the frame (14). Webs (20) lie in the medial plane of the frame and support the baffles (15). Holes and rebates (24, 25) are provided in the lower part of the insert to drain water from its interior. The foil (11) may be coated with hydrophilic material on one side.

22 Claims, 6 Drawing Sheets

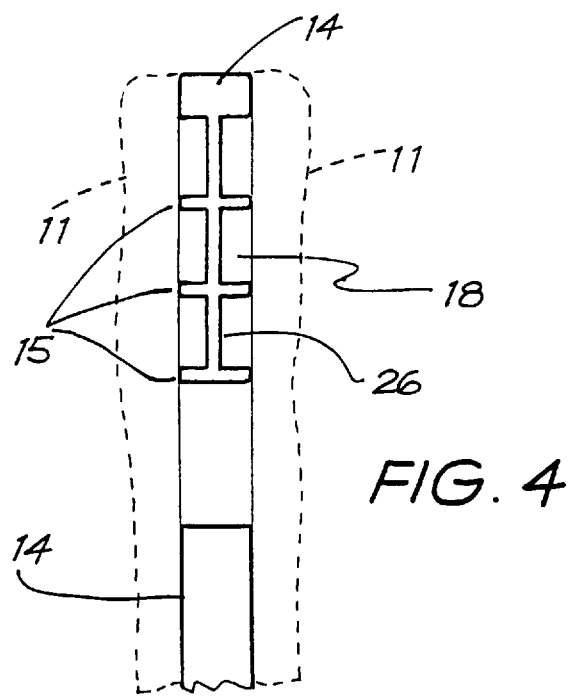
FIG. 4
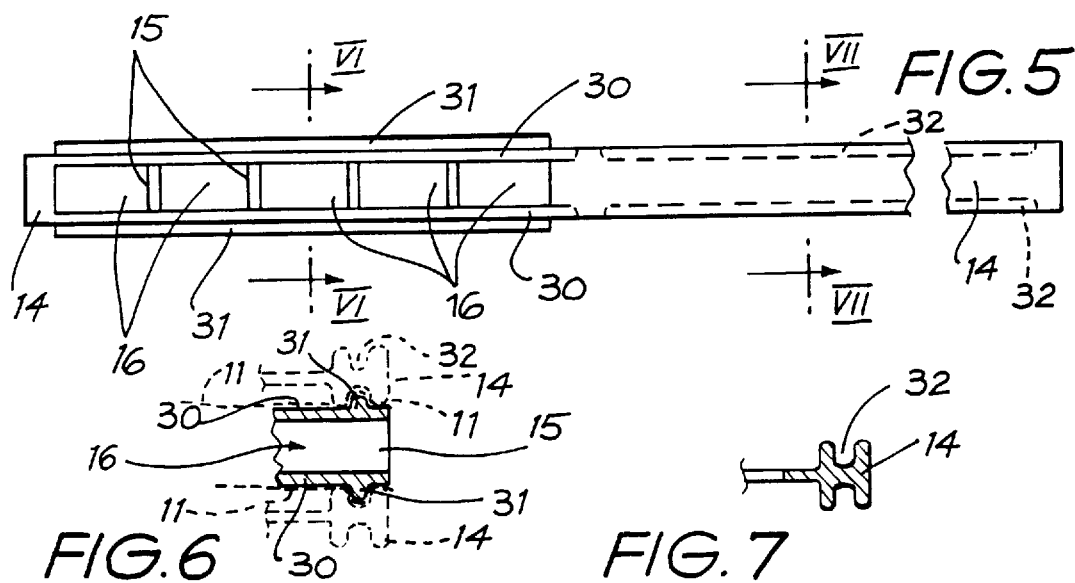
FIG. 5
FIG. 6
FIG. 7

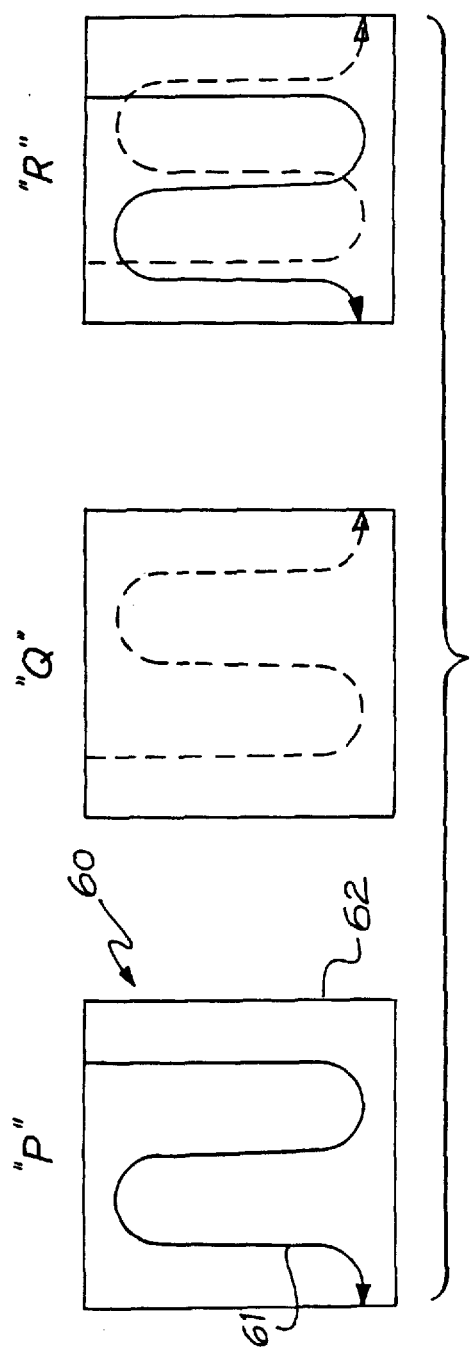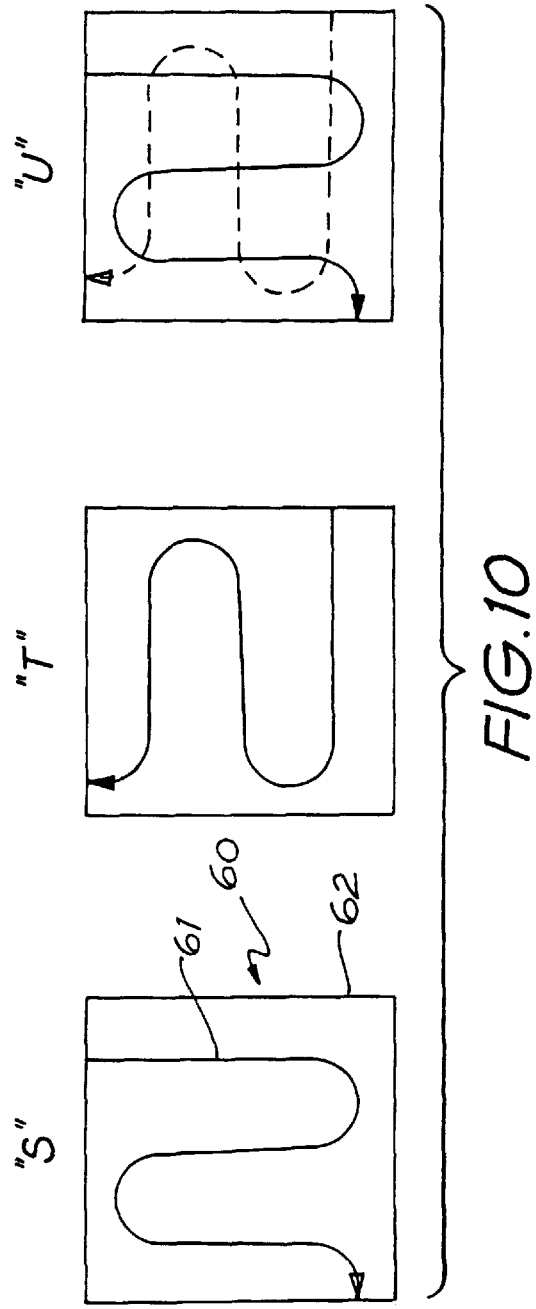

MOULDED BAFFLE HEAT EXCHANGER

FIELD OF THE INVENTION

This invention relates to a tubeless heat exchanger for transferring heat between two gasflow paths.

STATE OF THE ART

Heat exchangers for transferring heat between two isolated gas-flow paths have developed along different lines from liquid heat exchangers. This has resulted from the fact that gas, unlike a liquid, is incompressible and has a lower heat content per unit volume than a liquid. This has led to the development of heat exchangers in which the gas-flow paths have a large cross-sectional area so that there is an insignificant pressure drop between the gas inlet and outlet apertures of the heat exchanger. Also, thin materials are preferred because the transfer of heat from a gas to a surface along which it is travelling, takes place more slowly than is the case with a liquid which wets the surface.

The conventional form of heat exchanger for use with gases is the parallel plate heat exchanger. This comprises a stack of spaced, parallel metal plates which define, between them, pockets through which the gas flows. Alternate pockets are connected to carry one of the two gas streams between which heat is to be transferred, and the remaining pockets carry the other gas stream.

In order to extend the dwell time of the gases in the heat exchanger, it has been proposed to provide metal baffles in the pockets which extend the length of the gas-flow path through them and are in good thermal contact with the plates. Such an arrangement is disclosed in the Applicant's U.S. Pat. No. 5,078,208. This Patents discloses the feature of providing the parallel plates from a sinuously wound metal foil successive spaced areas of which provide the parallel spaced plates. It has also been proposed in the said Patent to use metal spacers between rectangular plates of a heat exchanger and which are shaped to produce counterflow passages in successive pockets so that the heat exchange efficiency is enhanced (see said Patent, column 8, between lines 36 and 55). Amongst other Patents disclosing the use of a sinuously wound metal strip are U.S. Pat. Nos. 4,131,159 and 4,343,355.

Recent developments in heat-conductive plastics have created interest in the use of plastics materials in place of metals in heat exchangers. Plastics sheeting can be made thinner than metal sheeting so that the reduced heat-transfer co-efficient of the plastics is offset by its reduced thickness. Also, pressing thin metal sheets into different shapes, which is normal practice for creating turbidity in the pockets of a heat exchanger, can result in stress creases and other problems occurring which make the construction of a heat exchanger from thin metal sheeting more difficult. Plastics on the other hand can be moulded without the formation of stress creases and is also capable of being vacuum-formed and hot-pressed into virtually any contour required, while being capable of being securely attached to a supporting frame at room temperature by the use of resinous cement.

Patent Specifications suggesting the use of plastics in the construction of heat exchangers are U.S. Pat. Nos. 4, 631, 213; 4,907,648 and 5, 050671. These three U.S. Patents and other proposals which have come to the Applicant's attention, suggest the use of plastics materials in heat exchangers as substitutes for components which previously were made of metal. Where such proposals have involved the use of plastics baffles in parallel pockets of the heat exchanger, such baffles have been held in place by being rigidly and continuously attached along one edge to one plastics plate of a parallel plate heat exchanger, built up by stacking such plates one above the other. Obviously, it is not practical to use such a technique with a sinuously wound strip of plastics, as the formation of such a strip with the baffles walls projecting from one face, would pose formidable manufacturing problems . Also, the thickness of the plastics sheet necessary to support the baffle edgewise on its surface is naturally large and consequently stiff and the heat transfer quality of such a plastics sheet would be poor.

OBJECT OF THE INVENTION

An object of the this invention is to provide an improved heat exchanger for transferring heat between two separate gas-flow paths.

SUMMARY OF THE INVENTION

A gas-flow heat exchanger in accordance with the present invention, comprises a set of parallel, spaced, heat-conductive areas providing between them a stack of pockets each containing parallel baffles which define a platen of passageways guiding the gas-flow path through the pocket between inlet and outlet openings, the openings being arranged in four parallel lines at the sides of the stack, two of the lines respectively containing the inlet and outlet openings associated with the gas flow paths of alternative pockets of the stack, while the remaining two lines respectively contain the inlet and outlet openings associated with the remaining pockets of the stack; in which heat exchanger each pocket contains a removable frame formed with the openings provided at the ends of the gas-flow path through it and supporting within the frame the parallel baffles which divide the gas-flow path into the platen of passageways.

PREFERRED FEATURES OF THE INVENTION

Suitably the combination of frame and baffles is provided by a skeletal structure made of plastics material. Suitably the structure is injection moulded.

Conveniently, each of the pockets contains an identical structure of frame and baffles, differently oriented so that the openings associated with alternate pockets lie in two lines, and the openings associated with the remaining pockets lie in two different lines.

The parallel heat-conductive areas separating the pockets from one another may be formed from spaced rectangular areas of a sinuously wound heat-conductive foil which is preferably made of metal, although a plastics foil is also conceivable. In some cases, the foil may be coated on one or both sides with a hydrophilic coating in order to assist heat transfer between the gas paths when the coating is in contact with water. The parallel areas may also each comprise a separate heat-conductive plate.

The baffles may define a generally U-shaped platen of passageways through the frame, or an S-shaped platen of passageways. Irrespective of the shape of the platen of passageways chosen, it is preferred that the baffles of neighbouring pockets register with one. another so that the heat-conductive areas separating the pockets can be firmly held in position by being sandwiched between the edges of adjacent registering baffles, at least over the major part of the lengths of the baffles.

The heat exchanger of the invention may be used to provide a counterflow heat exchanger, a cross-flow heat exchanger, or a parallel-flow heat exchanger, as desired.

INTRODUCTION TO THE DRAWINGS

The invention will now be described in more detail, by way of example, with reference to the accompanying largely diagrammatic and schematic drawings, in which:

IN THE DRAWINGS

FIG. 4 is a view of the upper end of an insert used in the formation of the stack and which is partly broken away, the view being in the direction of the arrow A in FIG. 3;

FIG. 5 is a view of the insert of FIG. 3 as seen from the direction B;

FIG. 6 is a cross section of FIG. 5 taken on the line indicated by the arrows VI—VI in that Figure;

FIG. 7 is a cross section through FIG. 5 taken on the lines indicated by the arrows VII—VII in that Figure;

FIG. 9 shows schematically, a second form of insert which is of square shape and can be used to provide a counterflow heat exchanger as illustrated in the three sketches of the Figure; and FIG. 10 shows the insert of FIG. 9 used to provide a cross-flow heat exchanger.

DESCRIPTION OF PREFERRED EMBODIMENT

Figure 1:
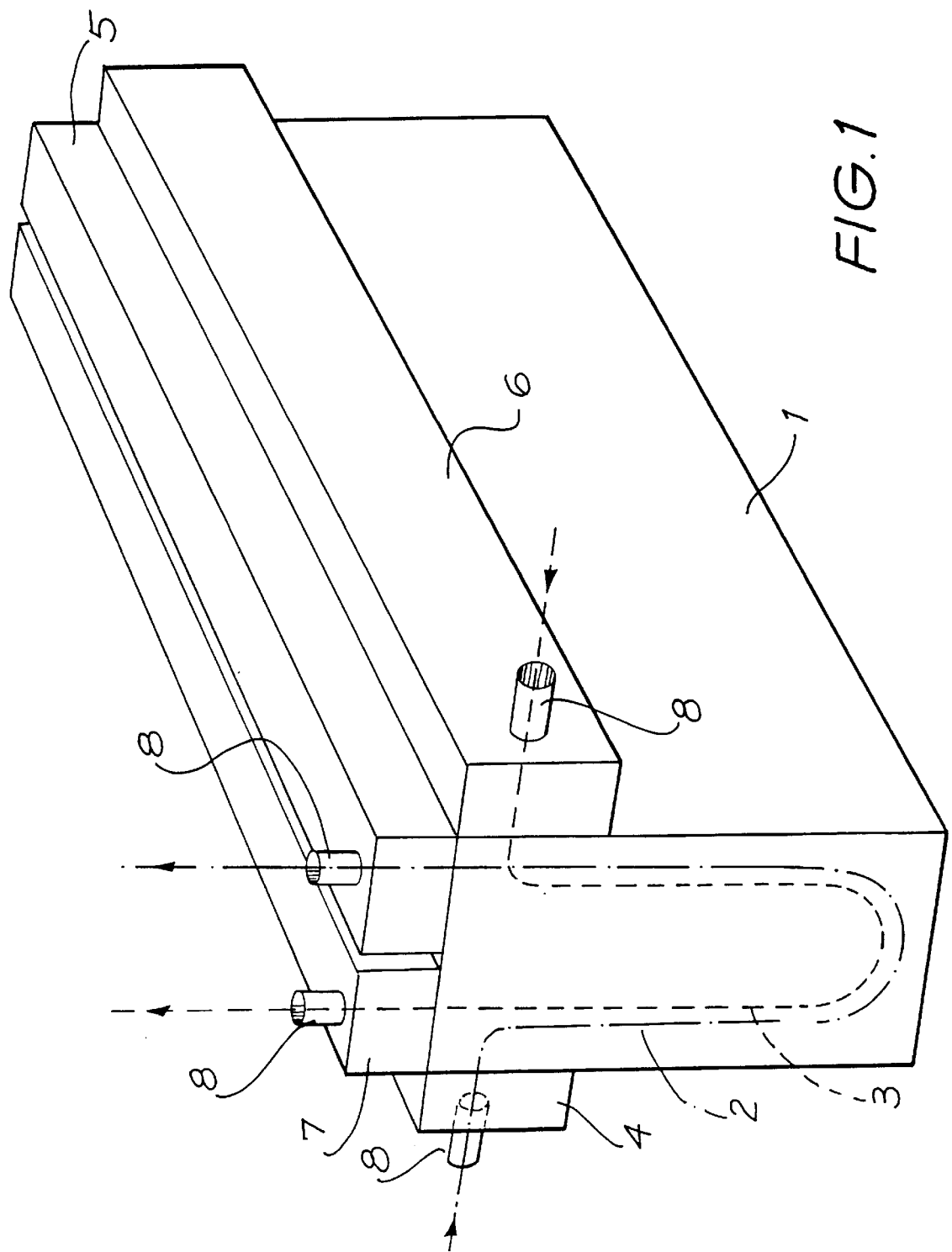
FIG. 1 is a perspective view of a cased heat exchanger.
Figure 2:
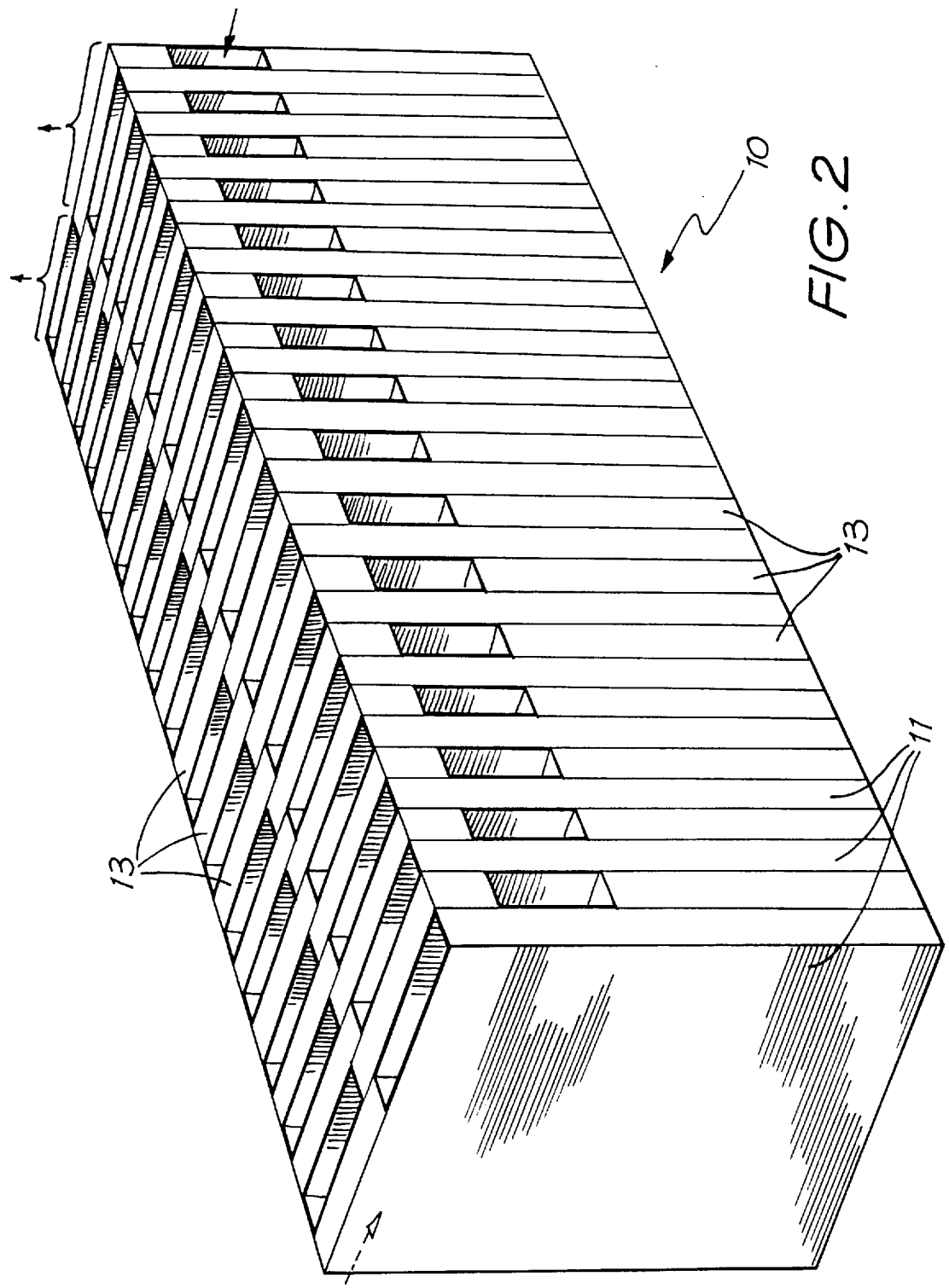
FIG. 2 is a perspective view of a parallelepiped heat exchanger stack used in FIG. 1, as would be seen were the casing and manifolds in FIG. 1 removed.

A closed casing 1 contains a parallelepiped-shaped heat exchanger stack as shown in FIG. 2, providing substantially parallel and aligned gas-flow paths 2 and 3 respectively shown in chain line and broken line. Each of the paths is contained within a separate pocket within the heat exchanger stack. Each pocket is formed between parallel planar areas of a foil made of a heat conductive material with the pockets containing the gas-flow paths 2, alternating with the pockets containing the gas-flow paths 3. The gas-flow paths 2 extend between a first inlet manifold 4 and a first outlet manifold 5. The gas-flow paths 3 extend between a second inlet manifold 6 and a second outlet manifold 7. Take-off piping for each of the manifolds is diagrammatically shown at 8. Each of the manifolds 4, 5, 6 and 7 extend the full length of the heat exchanger stack and the manifolds 4 and 7 occupy adjacent sides of one corner region of the stack whereas the manifolds 5 and 6 occupy adjacent sides of a neighbouring corner region of the stack. As is clearly apparent from FIG. 1, the gas-flow paths 2 and 3 extend parallel to one another apart from in a small area of the corner regions of the stack, and the gas travels through the paths 2 and 3 in counterflow directions to maximise heat transfer between them.

The parallelepiped heat exchanger stack is shown in FIG. 2 and referenced 10. It is composed of a sinuously-wound metal strip 11 providing a series of parallel pockets 12 as clearly shown in FIG. 3. This strip is made from thin aluminium foil which may be coated on one face with a hydrophilic thin coating (not shown). The foil is about 50 microns thick and has superb heat-conductive properties while being strong, flexible, and being easily bent.

A plastics moulded insert 13 is contained in each of the pockets. It is formed as a unitary assembly comprising a rectangular flat frame 14 containing a set of parallel baffle strips 15 which together define five parallel passageways 16 extending between a first opening 17 in one corner region of the frame, and a second opening 18 in an adjacent corner region of the frame 14. The baffle strips 15 are of a thin rectangular cross section and extend edgewise to opposite faces of the insert 13. Their edges lie in the same planes as the faces of the frame 14. The strips 15 are held in relative positions by linear webs 20 which lie in the medial plane of the insert 13 and are joined to the strips 15 and extend inwardly from the size of the frame 14. A central elongated oblong formation 21 in the centre of the insert 13 is held in place by the inner ends of most of the webs 20 and is integrally formed with an extension piece 22. The formation 21 and the extension piece 22 have the same edge-to-edge thickness as the strips 15 and serve as spacers isolating the forward and return runs of the innermost passageway 16 from one another.

The lower portions of the strips 15 are provided at their edges with three sets of aligned rebates 24 (illustrated diagrammatically) which allow any water inside the insert 13 to flow downwardly to the underside of the frame 14. Apertures 25 formed at the ends and the central portion of the lower frame side 14 allow the water to flow out. The rebates 24 and the apertures 25 are of small size so that gas-flow in the passageways between the strips 15 is unaffected by the presence of the rebates and apertures.

FIG. 4 shows how the opening 18 is formed. The corner region of the insert 13 is defined between the adjacent sides of the frame 14 and the opening 18 contains a central strip 26 integrally moulded with the end-portions of three of the baffle strips 15. As is apparent from FIG. 3, the fourth baffle strip terminates on one of the webs 20. This increases the cross-sectional area of the opening through which the outermost two of the passageways 16 pass towards the opening 18. All of the passageways 16 are of substantially uniform cross-section throughout their lengths so that gas entering them via the aperture 17, is distributed evenly between the passageways 16.

The material from which the plastics moulded insert is made, is tough, stiffly resilient and inert. A suitable material is polypropylene compound.

FIG. 5 shows the construction of the aperture 17 which is slightly different from the aperture 18. The aperture 17 has two flat, parallel and spaced side strips 30 forming continuations of the sides of the frame 14 so that the aperture 17 is formed between them. The end-portions of the baffle strips 1 5 are integrally moulded with the. side strips 30. Each of the side strips 30 is provided with a rib 31 extending along its length and which fits into a flute 32 formed in the opposed, side face of the side of the neighbouring frame 14. The metal foil 11 is trapped at its edges between the ribs 31 and flutes 32 which hold these edges firmly in place when the heat exchanger stack of FIG. 2 is assembled. FIG. 6 shows in broken outline how the foil 11 is trapped between overlapping frames of the inserts 13.

ASSEMBLY AND OPERATION OF THE FIRST EMBODIMENT

A jig of horizontal rectangular shape is prepared and an end portion of the thin metal foil strip 13 is placed across the base of the jig. One of the inserts 13 is then placed, face down, in the jig and the foil is passed around its side edge and across its top face. The next insert, appropriately oriented, is then placed, face down, in the jig and the foil 11 is drawn tightly up over the side of the frame and across its upper face. The third insert 13 is then positioned in registration with the first insert and the foil is drawn tightly across its upper face. The above process is repeated until a stack of the general shape shown in FIG. 2 and of the requisite height, has been prepared. The assembled stack, which now has the foil tightly gripped at its edges between the frames of the inserts is then transferred to a suitable holding casing 1 of the shape shown in FIG. 1.

The casing has four rectangular openings at the positions of the ends of the gas-flow paths 2 and 3, respectively. The four rectangular box manifolds 4, 5, 6 and 7 are inserted into these openings so that their edges butt up against the apertures 17 and 18 defining the inlet and outlet openings to the passageways provided by the baffle strips 15. Gaskets may be used to complete the seals between the manifolds and the stack.

Figure 3:
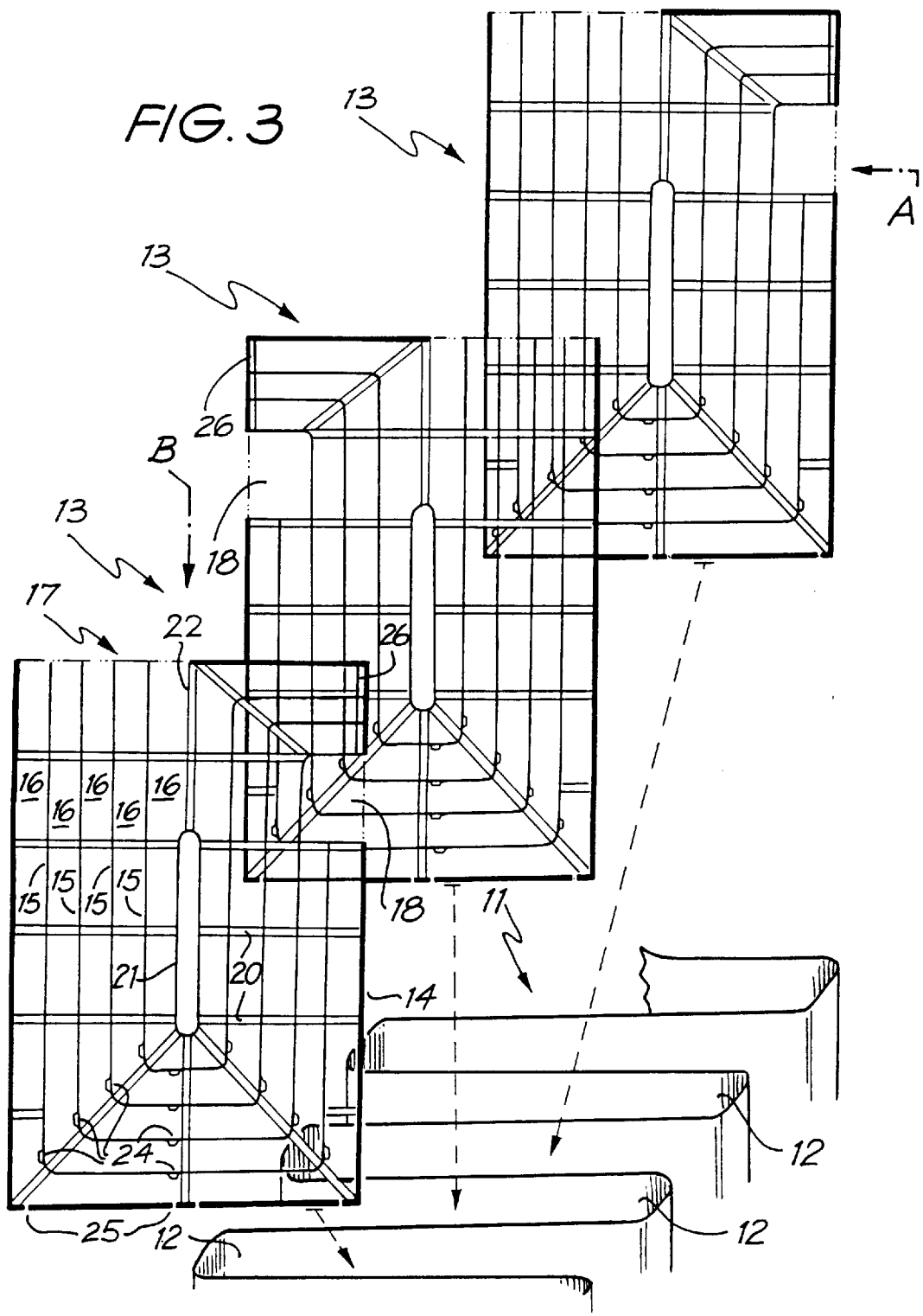
FIG. 3 is a perspective and exploded view of part of the heat exchanger stack of FIG. 2.

When the heat exchanger is in use, gas at one temperature enters the nozzle 8 and is distributed along the length of the manifold 4. It passes from the manifold 4 uniformly into the parallel gas-flow paths 2 each of which is split into a platen of parallel passageways 16 as shown in FIG. 3. These passageways convey the gas through alternative pockets of the heat exchange stack to the outlet manifold 5 from which it is discharged through the nozzle 8.

The remaining pockets of the stack contain the gas-flow paths 3 which receive gas at a different temperature from the inlet manifold 6 and convey the gas through the heat exchanger stack to the outlet manifold 7. As is apparent from FIG. 3, the strips 15 of the inserts 13 lie in the same plane substantially throughout the stack - the corner regions of the stack being the only areas where this is not the case - and thus the parallel planar areas of the metal foil separating the pockets are tightly gripped between the flat edges of the strips 15. The alignment of the strips 15 also ensures that the passageways 16 in neighbouring pockets are in alignment with one another. Thus extremely good counterflow heat-transfer characteristics are obtained between adjacent pockets of the heat exchanger stack.

It will be noted that the above construction of heat exchanger stack requires only two components: a thin metal heat-conductive foil strip 11 having parallel edges, and a set of plastics skeletal inserts providing the frames for the pockets, the baffles which compartment the pockets into parallel passageways 16, and the gas inlets and outlets at opposite ends of the passageways. As is apparent from FIG. 3, all of the inserts are identical but alternative inserts are turned through 180 degrees with respect to the remaining inserts. The use of plastics for the inserts ensures that their relatively poor thermal conductivity reduces the escape of heat through the frames 14. The webs 20 hold the baffle strips 15 defining the gas-flow paths 16 through the pockets firmly in place. The inlet and outlet apertures of alternate pockets are arranged in two lines respectively, and these lines do not overlap the lines of inlet and outlet apertures disposed at the ends of the gas-flow paths through the remaining pockets. Cheapness and simplicity of construction is therefore achieved with a high rate of heat transfer between the two gases which are in heat-transfer relationship in the pockets of the stack.

In some circumstances it is required to cool the incoming air to the room by evaporating moisture droplets sprayed into the stale air stream leaving the room. This is achieved by coating the face of the foil sheet 11 defining opposite sides of the pockets through which the stale air leaves the room, with a hydrophilic material. The inserts 13 located in these pockets allow any surplus water in the stale air to flow down the vertical portions of the baffle strips 15 and into the bottom of the frame 14 through the sets of aligned rebates 24 provided in the baffle strips 15. This water is then discharged from the frame 14 through the apertures 25 providing weep holes in the lower end of the frame 14.

A USE OF PREFERRED EMBODIMENT

Figure 8:
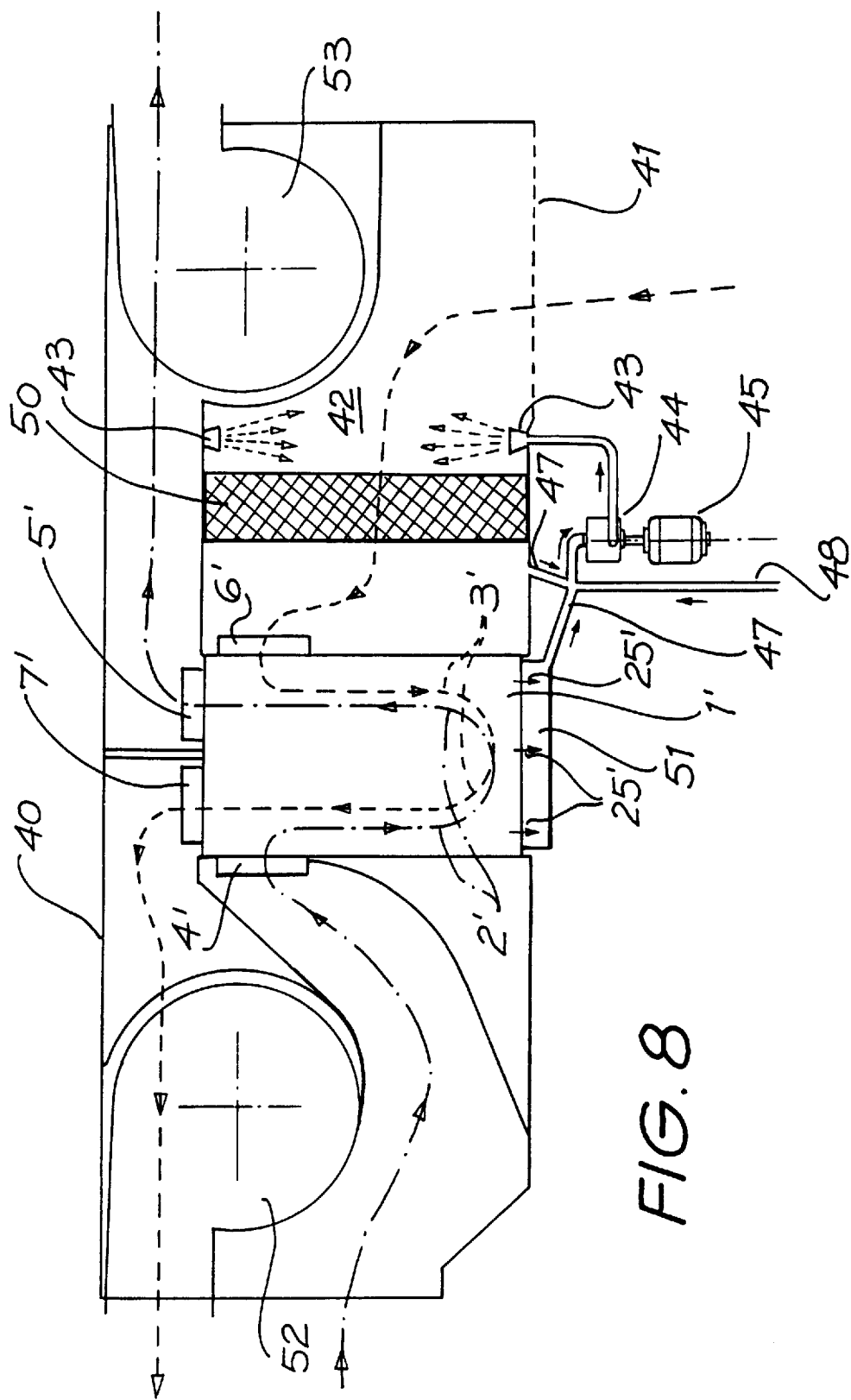
FIG. 8 is a diagrammatic side elevation of an air conditioning system using the heat exchanger of FIG. 1.

The above described heat exchanger may be used in any situation where heat is required to be transferred from one gas to another. It may also be used in an air conditioner of the form shown in FIG. 8. In FIG. 8 parts corresponding to those of Figures already described, are similarly referenced, but the references are primed.

In FIG. 8, a housing 40 contains a casing 1' in which is positioned a heat exchanger of the type already described with reference to FIGS. 2 to 7. A room which is to be temperature stabilized at a temperature beneath that of the ambient air, has its stale air drawn upwardly through a grill 41 into a space 42 into which is continuously discharged an atomised spray of water through nozzles 43. This water is obtained from a pump 44 driven by a motor 45 and the input to the pump 44 receives recycled water through ducts 47 together with make-up water through a duct 48.

The moisture laden air from the space 42 is drawn through a labyrinthine structure 50 composed of crossed channels of treated corrugated cardboard which is sold under the trade mark CELDEK by Munters Pty. Limited, of Albury, Australia. The structure 50 offers negligible pressure drop to the gas passing through it, while allowing the moisture droplets to precipitate on its surfaces without affecting them. The stale air emerging from the structure 50 therefore contains a high content of atomised water droplets when it enters the manifold 6'.

Manifold 6' is connected to alternate pockets of the heat exchanger stack which are defined between hydrophilic surfaces of the metal foil 11. The moisture droplets in the stale air entering the heat exchange path 3 precipitate on, and are evaporated off the hydrophilic surfaces of the foil. Surplus water runs off the foil and strips 15, through the rebates 24 and apertures 25' to collect in a sump 51 from which it is fed back through one of the conduits 47 to the pump 44. The moist stale air leaves the casing 1 through the manifold 7' and is exhausted to atmosphere by a blower 52 represented on the left hand side of FIG. 8.

Fresh air is drawn in from the atmosphere and enters the manifold 4 which distributes it through the pockets of the stack containing the gas-flow paths 2'. These paths 2' are in excellent counterflow heat exchange relationship with the paths 3', as already described, so that much of the heat contained in the incoming air which is at a higher temperature than that in the room, is transferred through the foil walls of the pockets to cause heating of the stale air and vaporisation of much of its moisture content. The partial vaporisation of the moisture content extracts the latent heat of evaporation from the incoming air which is therefore cooled by its passage through the gas paths 2' of the heat exchanger, without actually coming into contact with the water sprayed into the stale air leaving the room.

The cooled clean air from atmosphere is drawn out of the heat exchanger through the manifold 5' and discharged into the room by a second blower 53 shown at the right-hand side of FIG. 8. Preferably the blowers 52 and 53 are identical to one another and are driven by the same motor so that the rate of discharge of stale air from the room is marginally less than the rate of entry of fresh air into the room.

From the above description of FIG. 8 it will be appreciated that the room is continuously supplied with clean air at a temperature less than that of the external ambient air, and without having to use a closed refrigeration circuit. The only power necessary is that required to operate the pump 44 and the blowers 52 and 53.

MODIFICATION OF THE INVENTION

FIG. 9 shows a first modification of the heat exchanger and which utilizes square plastics inserts 60 providing an S-shaped gas-flow path 61 of the shape illustrated. The gas flow path is subdivided into passageways (not shown) in the same way as has already been described with reference to earlier Figures and it will be appreciated that FIG. 9 is a diagrammatic view of an insert having a square frame 62.

Also, the use of the CELDEK structure is not essential.

Sketch P of FIG. 9 shows the insert and the general direction of the gas-flow path through it, as seen from from one side. Sketch Q shows the same insert as it appears when turned through 180 degrees about its right hand vertical edge (as seen in FIG. 9). Sketch R is a superimposition of sketches P and Q and shows how the gas-flow paths have substantial portions of their lengths in parallel-flow, rather than counterflow, although their return bends are arranged in cross-flow.

FIG. 10 again shows the square insert of FIG. 9 in sketch S but sketch T shows the insert turned through 90 degrees in its own plane. If the inserts S and T are now superimposed as shown in sketch U, a cross-flow heat exchanger results.

The purpose of FIGS. 9 and 10 are to illustrate the ease with which a standard cheap plastics skeletal insert, can, by appropriately positioning it in its pocket in a heat exchanger stack, be made to provide heat exchangers having different heat-transfer characteristics.

FURTHER VARIATIONS OF THE INVENTION

Although the invention has been described with reference to sinuous heat-flow paths through a heat exchanger, the shape of the path is immaterial. The important feature of the invention which gives it its uniqueness, is the appreciation of the cheapness and versatility of a gas-flow heat exchanger constructed only of spaced thin planar parallel areas having excellent heat-transfer characteristics (such as when made of thin metal) and defining pockets; and, plastics moulded inserts which each provide (a) a frame fitting into the shape of the pocket, (b) openings in the frame defining opposite ends of the gas-flow path through the pocket, and (c) a skeletal arrangement of baffle strips which define a platen of parallel passageways through the pocket.

In one example of insert shown in FIG. 3, the shorter sides of the frame are each 30 cm. long; the longer sides of the frame are each 45 cm. long; the medial webs 20 are 1 cm. wide and 1.5 mm. thick; the thickness of the sides of the frame, measured between opposite faces of the insert, is 7 mm. which corresponds to the edge-to-edge thickness of the baffle strips; and, the length of the aperture 18 is 14.5 cm. The cross sectional shape of the aperture 17 is 14 cm by 5 mm.

Although the invention has been described in its use in an air conditioning unit, it is not to be regarded as being limited to such use as it may be employed anywhere where it is required to transfer heat between two separate gas streams.

As stated it is preferred that the thin, spaced planar conductive areas separating the pockets from one another, are made from spaced zones of a continuous foil. However, this is not essential. For instance, the composite heat exchanger of the invention may comprise a stack of spaced, parallel, thin, separate plates having good thermally-conductive properties and which have the plastics moulded inserts sandwiched between them. Such a heat exchanger stack can be readily assembled in a jig. Although metal is currently preferred for the parallel planar areas, the development of ultra thin plastics materials such as that commercially known under the trademark MYLAR may well be usable in some designs and applications of heat exchanger in place of metal as the thinness of MYLAR enables its ability to transport heat between its opposite faces to be very good indeed.

I claim:
1. A gas flow heat exchanger comprising:
   (a) a set of parallel, spaced, heat-conductive areas defining between them a stack of pockets each flanked by two of said areas,
   (b) a plurality of flat frames removably located in said pockets respectively, each frame having two opposite faces with a thickness of the frame therebetween, a medial plane, and an inside and an outside, and each frame being formed within its thickness with a gas inlet opening and a gas outlet opening which extend from the inside to the outside of the frame,
   (c) a set of parallel, spaced and partially-curved baffle strips contained within the thickness of each frame and forming a unitary assembly therewith, the baffle strips extending transversely of the medial plane of the frame and having longitudinally extending edges engaging the respective areas flanking the pocket containing the frame, and
   (d) a flat layer of open-sided parallel passageways extending through the medial plane of each frame to guide the flow of gas through the pocket from the gas inlet opening to the gas outlet opening, each passageway being defined by a pair of neighboring baffle strips and the opposed surfaces of the two heat-conductive areas flanking the pocket,
   in which heat exchanger alternate frames of the stack are similarly oriented with respect to one another but differently oriented with respect to the remaining frames, which are also similarly oriented with respect to one another, and
   wherein the baffle strips of a first frame, in a first pocket, register with the baffle strips of a second frame, in an adjacent pocket, over substantially the entire length of the baffle strips so that the passageways defined in the first frame are substantially aligned with the passageways defined in the second frame and the heat conductive area between the first and second frames is sandwiched between the baffles of the first and second frames respectively and is held at an edge between interfitting portions of the first and second frames.

2. A heat exchanger according to claim 1, wherein each frame and the baffle strips contained within the thickness of the frame are made of a plastic.

3. A heat exchanger according to claim 2, wherein each frame includes webs that support the baffle strips relative to the frame, the webs being made of a plastic and being integrally molded with the frame and baffle strips.

4. A heat exchanger according to claim 3, wherein the frame is of rectangular shape and the webs extend inwardly from the frame in its medial plane.

5. A heat exchanger according to claim 1, wherein the set of parallel, spaced heat conductive areas are formed by spaced segments of a continuous rectangular, flexible aluminum foil wound in sinuous fashion to define the pockets.

6. A heat exchanger according to claim 5, wherein the foil is provided with a hydrophilic coating on at least one side.

7. A heat exchanger according to claim 1, wherein each frame has two adjacent sides that extend between the two opposite faces of the frame and meet at a corner of the frame, the gas inlet opening and the gas outlet opening are arranged in the two adjacent sides respectively and the passageways from the gas inlet opening to the gas outlet opening are substantially U-shaped.

8. A gas flow heat exchanger comprising:
   (a) a set of parallel, spaced, heat-conductive areas defining between them a stack of pockets each flanked by two of said areas, (b) a plurality of flat frames removably located in said pockets respectively, each frame having two opposite faces with a thickness of the frame therebetween, a medial plane, and an inside and an outside, and each frame being formed within its thickness with a gas inlet opening and a gas outlet opening which extend from the inside to the outside of the frame, (c) a set of parallel, spaced and partially-curved baffle strips contained within the thickness of each frame and forming a unitary assembly therewith, the baffle strips extending transversely of the medial plane of the frame and having longitudinally extending edges engaging the respective areas flanking the pocket containing the frame, and (d) a flat layer of open-sided parallel passageways extending through the medial plane of each frame to guide the flow of gas through the pocket from the gas inlet opening to the gas outlet opening, each passageway being defined by a pair of neighboring baffle strips and the opposed surfaces of the two heat-conductive areas flanking the pocket, in which heat exchanger alternate frames of the stack are similarly oriented with respect to one another but differently oriented with respect to the remaining frames, which are also similarly oriented with respect to one another, and wherein each frame is formed along a lower side with apertures for draining liquid from its interior, and portions of the baffle strips adjacent said lower side of the frame have rebates permitting liquid to flow past the baffle strips to the lower side of the frame.

9. A heat exchanger according to claim 8, wherein each frame and the baffle strips contained within the thickness of the frame are made of a plastic.

10. A heat exchanger according to claim 9, wherein each frame includes webs that support the baffle strips relative to the frame, the webs being made of a plastic and being integrally molded with the frame and baffle strips.

11. A heat exchanger according to claim 10, wherein the frame is of rectangular shape and the webs extend inwardly from the frame in its medial plane.

12. A heat exchanger according to claim 8, wherein the set of parallel, spaced heat conductive areas are formed by spaced segments of a continuous rectangular, flexible aluminum foil wound in sinuous fashion to define the pockets.

13. A heat exchanger according to claim 12, wherein the foil is provided with a hydrophilic coating on at least one side.

14. A heat exchanger according to claim 8, wherein each frame has two adjacent sides that extend between the two opposite faces of the frame and meet at a corner of the frame, the gas inlet opening and the gas outlet opening are arranged in the two adjacent sides respectively and the passageways from the gas inlet opening to the gas outlet opening are substantially U-shaped.

15. A heat exchanger according to claim 8, incorporated into an air conditioning unit having a labyrinthine structure with associated means for saturating a stale air stream leaving a room with water vapor before the stale air enters a flow path of the heat exchanger.

16. A gas flow heat exchanger comprising:

(a) a set of parallel, spaced, heat-conductive areas defining between them a stack of at least first and second adjacent pockets each flanked by two of said areas, (b) at least first and second flat frames removably located in said first and second pockets respectively, each frame having two opposite faces with a thickness of the frame therebetween, a medial plane, and an inside and an outside, and each frame being formed within its thickness with a gas inlet opening and a gas outlet opening which extend from the inside to the outside of the frame, the first and second frames being differently oriented, (c) a set of parallel, spaced and partially-curved baffle strips contained within the thickness of each frame and forming a unitary assembly therewith, the baffle strips extending transversely of the medial plane of the frame and having longitudinally extending edges engaging the respective areas flanking the pocket containing the frame, and (d) a flat layer of open-sided parallel passageways extending through the medial plane of each frame to guide the flow of gas through the pocket from the gas inlet opening to the gas outlet opening, each passageway being defined by a pair of neighboring baffle strips and the opposed surfaces of the two heat-conductive areas flanking the pocket, and wherein the baffle strips of the first frame, in the first pocket, register with the baffle strips of the second frame, in the second pocket, over substantially the entire length of the baffle strips so that the passageways defined in the first frame are substantially aligned with the passageways defined in the second frame and the heat conductive area between the first and second frames is sandwiched between the baffles of the first and second frames respectively and is held at an edge between interfitting portions of the first and second frames.

17. A heat exchanger according to claim 16, wherein each frame and the baffle strips contained within the thickness of the frame are made of a plastic.

18. A heat exchanger according to claim 17, wherein each frame includes webs that support the baffle strips relative to the frame, the webs being made of a plastic and being integrally molded with the frame and baffle strips.

19. A heat exchanger according to claim 18, wherein the frame is of rectangular shape and the webs extend inwardly from the frame in its medial plane.

20. A heat exchanger according to claim 16, wherein the set of parallel, spaced heat conductive areas are formed by spaced segments of a continuous rectangular, flexible aluminum foil wound in sinuous fashion to define the pockets.

21. A heat exchanger according to claim 20, wherein the foil is provided with a hydrophilic coating on at least one side.

22. A heat exchanger according to claim 16, wherein each frame has two adjacent sides that extend between the two opposite faces of the frame and meet at a corner of the frame, the gas inlet opening and the gas outlet opening are arranged in the two adjacent sides respectively and the passageways from the gas inlet opening to the gas outlet opening are substantially U-shaped.

* * * * *